US007756801B2

(12) United States Patent
Reich et al.

(10) Patent No.: US 7,756,801 B2
(45) Date of Patent: Jul. 13, 2010

(54) SYSTEMS AND METHODS FOR ARCHITECTURE INDEPENDENT PROGRAMMING AND SYNTHESIS OF NETWORK APPLICATIONS

(75) Inventors: James E Reich, Mountain View, CA (US); Daniel L Larner, San Jose, CA (US); Amol B Bakshi, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1640 days.

(21) Appl. No.: 10/986,850

(22) Filed: Nov. 15, 2004

(65) Prior Publication Data

US 2006/0112396 A1    May 25, 2006

(51) Int. Cl.
  *G06N 5/00*    (2006.01)
  *G06F 17/00*   (2006.01)
(52) U.S. Cl. .................. 706/45; 700/100; 718/100; 709/226
(58) Field of Classification Search ............ 706/45, 706/12; 700/100; 718/100
  See application file for complete search history.

(56) References Cited

U.S. PATENT DOCUMENTS

2005/0005272 A1* 1/2005 Moody et al. ............... 718/104
2005/0257221 A1* 11/2005 Inchingolo et al. .......... 718/100

* cited by examiner

*Primary Examiner*—Donald Sparks
*Assistant Examiner*—Kalpana Bharadwaj
(74) *Attorney, Agent, or Firm*—Oliff & Berridge, PLC (57) ABSTRACT

Various implementations provide for a task assignment method that describes a spatial computing application by providing an abstract task graph (ATaG) wherein the abstract task graph specifies the behavior of the application without reference to the number, placement and connectivity of the nodes performing the application and the tasks are automatically mapped to the network. The ATaG specifies a set of tasks, a set of data objects and a set of channels, including various constraints and preferences on where in the network tasks may be performed, how data is moved between locations and the data required at various locations. Moreover, various implementations provide for a task assignment system which maps the abstract tasks and channels to specific nodes and communication links, either at the time of the construction of the system or throughout the time of its operation.

14 Claims, 5 Drawing Sheets

SYSTEMS AND METHODS FOR ARCHITECTURE INDEPENDENT PROGRAMMING AND SYNTHESIS OF NETWORK APPLICATIONS

BACKGROUND

1. Field

The invention relates to computer networks in general, and in particular to the synthesis of a spatially-distributed network through architecture independent programming.

2. Description of Related Art

U.S. Pat. No. 4,949,253 describes a program generation method in which input relates to data declaration and the "manner of use" of the data. A library of part prototypes exists, where each part prototype is customized based on the input data declaration, and a "program part" is generated that performs a suitable transformation on the data. This method basically applies to automatic generation of transformational "functions" or "methods" on specified data structures.

U.S. Patent Application Publication No. 20040006761 describes an application software that comprises three units; one running on a sensor node, a second on a gateway, and a third on a server. The basis of the method is an assumed uniformity in the structure of these three units, notwithstanding minor customization of parameters. The nature of interaction between these three unit units is assumed to be fixed— the unit on the sensor node transmits information to the unit on the gateway, which in turn transmits information to the unit on the server. Each of these units consists of a set of components with a behavior that can be configured through parameters, and a mechanism that allows components on the same node to communicate with each other. This publication also describes a graphical interface that exposes a library of pre-defined components to the user of the interface. Annotations, termed "shells", may include the name and functionality of the component, as well as its performance characteristics, such as memory usage and code size. The information in the shells of components that are used to construct a specific application unit can be analyzed to determine the performance characteristics of the unit.

U.S. Pat. No. 5,038,296 describes an automatic program synthesizer in which a system specification is input based on a pre-defined specification set. A set of subsystems acts upon the system specification to produce a target program. The specification set describes the target program in detail. A list of variable names and their associated meanings are stored by a variable attribute management system. Program generating means interacts with the variable attribute management system to retrieve variable names and use the names in the target program. Before the final program is generated, the user can edit the program, for example, if undefined variables are encountered.

U.S. Pat. No. 5,315,710 describes a method by which a plurality of program components with possibly non-matching interfaces can be combined into a larger new program. The method stores transformation rules for pairs of non-matching interfaces and non-matching data specifications. When two non-matching interfaces are to be reconciled, the transformation rules are used by a "mediating program generator" to generate mediating programs that handle the communication between mismatched interfaces.

All of the references indicated above are herein incorporated by reference in their entirety for their teachings.

SUMMARY

With state-of-the-art programming tools and methodologies, customization of a network and of the type of tasks to be performed by each node of the network is typically the responsibility of the programmer. Architecture-dependent programming limits the portability and extensibility of solutions, and also increases the cost of development because the programmer requires expertise not only in the application domain, but also in the networking domain. Accordingly, architecture independence is an attractive feature. Architecture independence in the context of network programming refers to the ability to specify application behavior for a generic, parameterized, network architecture. Architecture independence has the obvious advantage of portability, which means that the same application may be automatically synthesized for different network deployments or adapted as nodes fail or are added to the system. Furthermore, it allows development of the application to proceed prior to decisions being made about the final configurations of the nodes and network Various implementations provide a task assignment method that includes determining the location within a network where a set of tasks are to be performed, based on user input in the form of an abstract task graph, wherein the abstract task graph comprises a set of tasks, a set of data objects and a set of channels, and is specified independent of the network composition, tasking or configuration.

Moreover, various implementations provide a task assignment system that includes a controller, the controller that dynamically controls distribution of tasks and communication channels based on an abstract task graph wherein the abstract task graph comprises a set of tasks, a set of data objects and a set of channels, and a controller that controls performance of the set of tasks and uses the data objects and the channels to configure a network, wherein the tasks, the data objects and the channels are architecture independent.

Also, various implementations provide a machine readable medium that provides instructions for configuring a network, the instructions, when executed by a processor, cause the processor to perform mapping of the network on which a set of tasks are to be performed based on an abstract task graph that comprises a set of tasks, a set of data objects and a set of channels, and performing the set of tasks on relevant nodes of the network using the data objects and the channels, wherein the tasks, the data objects and the channels are architecture independent.

BRIEF DESCRIPTION OF THE DRAWINGS

Various exemplary implementations of systems and methods described in detail, with reference to the following figures, wherein.

DETAILED DESCRIPTION

An abstract task graph (ATaG) representation is defined that may be used to describe the behavior of a desired application in a manner independent of the architecture of a particular network on which the application is to be performed. The terms "network" and "network applications", as used in this application, pertain generally to systems, such as sensor networks, where the physical location and time of origin of a data item in the network plays an important role in the processing applied to that data item. More generally, the systems and methods are relevant to "spatial computing" applications such as, for example, those encountered in wireless sensor networks, networks of traffic lights in a city, and the like. The common characteristic of such applications is that collaborative computation among spatially proximate computing nodes is meaningful at the application level.

The architecture of a spatial computing network generally include parameters that may vary over time, from one deployment of the network to another, and that may be decided during the installation process of the network rather than pre-planned. These parameters may include, but are not limited to, the number of nodes in the network, the placement of each node in a real or virtual coordinate system, the connectivity of the network, the resources available to each node, and the like. For example, the set of resources may include the computing resources, storage resources (memory, disks, and the like), communication resources (bandwidth, transmission range, and the like), and sensing resources (e.g., the number and types of sensing interfaces available).

Figure 1:
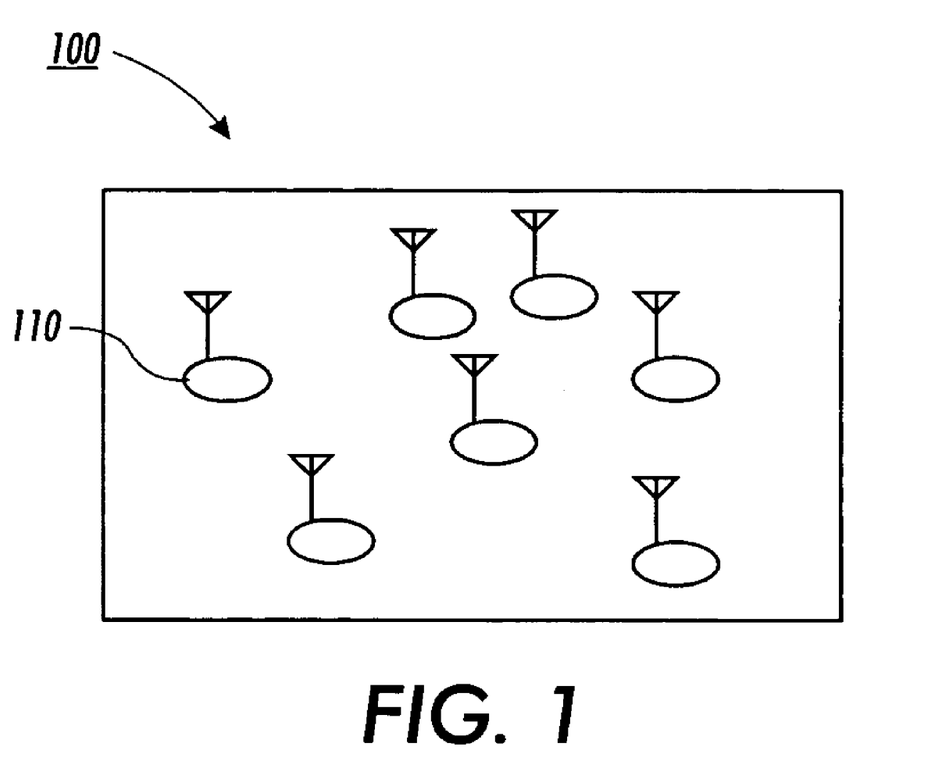
FIG. 1 is an illustration of an exemplary network.

FIG. 1 is an illustration of an exemplary network 100. In FIG. 1, the network 100 has a specific architecture, i.e., a specific number of nodes deployed at specified locations, with each node having a specified set of resources. The programming and synthesis of network applications is too often architecture dependent, where the type of tasks to be performed by each node 110 may be customized for the specific architecture of the network 100.

A data driven paradigm may be adapted to realize the goal of architecture independence for network programs. Data driven computation is a non-von Neumann paradigm where the availability of operands triggers the execution of the operation that is to be performed on the operands. A data driven program is usually described in terms of a directed graph where the edges of the graph represent the data flow and vertices of the graph represent the computational tasks to be performed on the data. Data driven semantics for such a graph mean that when all data items are available on the incoming edges of one of the vertices (tasks), those instruction (tasks) are enabled for execution. During execution, one data token may be removed from each input edge and output tokens may be released on the outgoing edges. Many variations of the basic dataflow model have been defined and are available in scientific literature.

For computing in parallel and distributed systems in general, a data driven programming model is attractive for reasons of programming convenience from the perspective of end users. When tasks are specified only in terms of their input and output data objects, and all task execution, scheduling, and communication is managed by an underlying runtime, a programmer can focus on high level algorithm design and optimization. Moreover, tasks do not directly invoke each other. Instead, a task merely produces data objects, or tokens, which trigger the execution of tasks that have am input dependency on those tokens. This decoupling of task interfaces allows the application to be modular and extensible.

Figure 2:
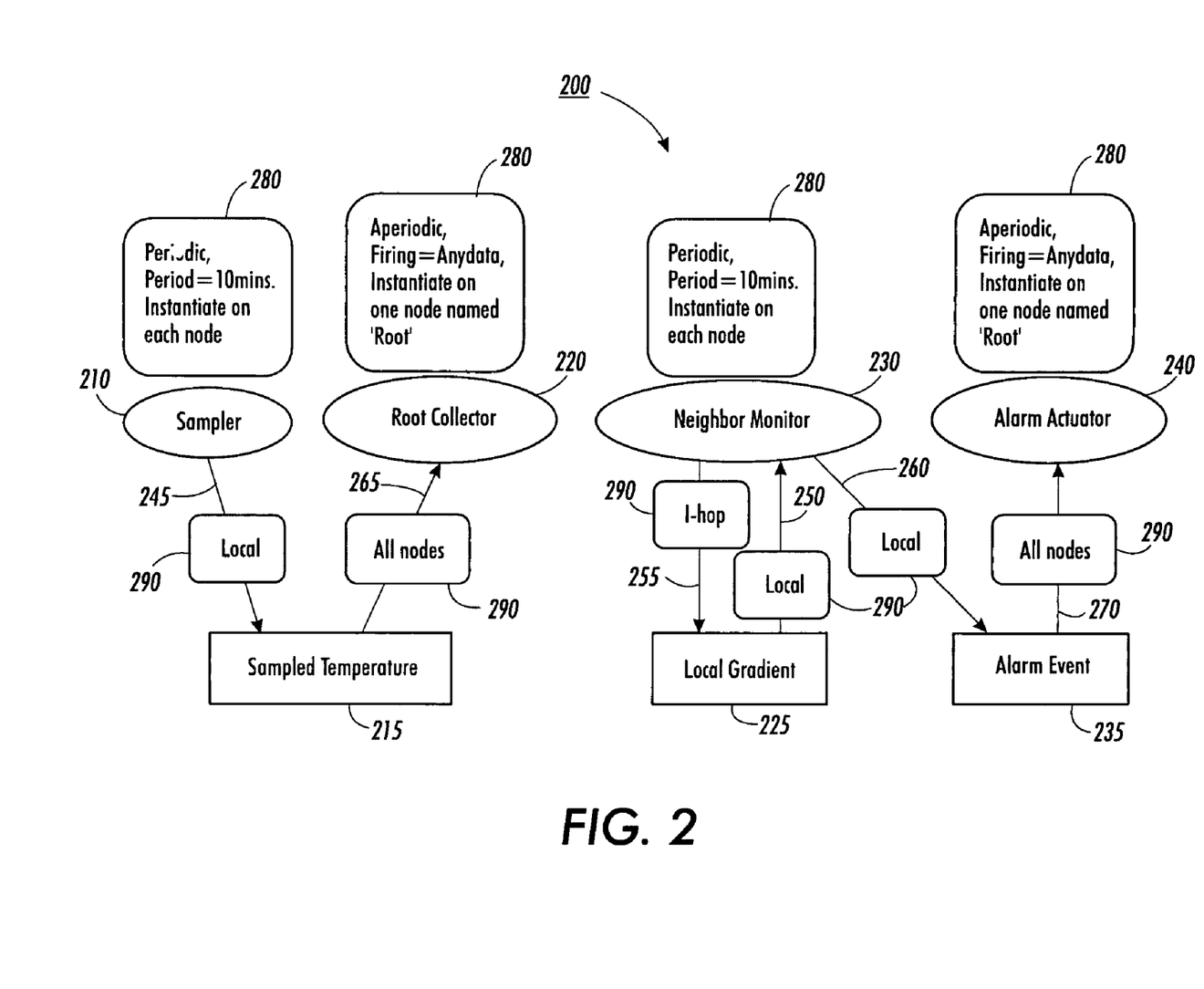
FIG. 2 is an illustration of an exemplary abstract task graph.

In the specific case of networked spatial computing applications, the purpose of using a data driven approach is twofold. First, a data driven representation allows a simple and intuitive expression of the inter-process coordination across the network at a high level. Second, data driven programs are usually supported by an intelligent runtime that may incorporate many optimizations relating to resource usage that the application developer need not be aware of or involved in developing Two advantages of using a data driven model for network programming are intuitive semantics, and reduced complexity, especially for the class of 'spatial computing' applications in sensor-actuator networks. In such applications, almost all in-network processing is triggered by the availability and/or the nature (values) of the data. Processing tasks can therefore be naturally defined in terms of operations over data objects. Various tasks may be decoupled from each other, wherein the execution of a specific task is triggered by a specific data object regardless of the status of other tasks on a specific node or on adjacent nodes. Accordingly, a user may be free to vary the specific parameters of each task, or even change the task implementation without affecting other tasks, as long as the task, interface in terms of data objects produced and consumed remains the same. Moreover, a major obstacle to application development for networks is generally the complexity of control and coordination, a significant portion of which resides in the details of various network protocols. The use of a data driven model for application specification enables most of this complexity to be hidden from the programmer because the detail of control and coordination may be managed almost entirely by the runtime system FIG. 2 is an illustration of an exemplary abstract task graph 200. Application behavior is specified using the abstract task graph 200 in an architecture-independent manner. The abstract task graph 200 may be used to describe the general nature of processing and data transfer in the network without linking to a specific deployment. The graph is abstract because the number of instances of each type of task, the placement of tasks, the number of instances of each type of data object, the route followed by data, the network protocol used for data transfer, and the like, may be automatically determined when the abstract task graph is compiled onto a specific network. The abstract task graph 200 may comprise: i) a set of tasks, ii) a set of data objects, and iii) a set of interest channels that associate a task with one or more data objects.

For instance, in a very simple application designed for a network of sensor nodes, each equipped with one temperature sensor, the designed global behavior of the application may be that each sensor node should (i) sample its environment once every 30 minutes and transmit the temperature reading to a designated root node, and (ii) once every 10 minutes, compare the local temperature with that of all 1-hop neighbors, and if a difference of more than 5 degree Celsius is detected, an alarm notification should be sent to the desired root node.

A node x is a 1-hop neighbor of a node y if node y is within radio range of node x. The radio range may be meaningful is the communication in the network is performed using wireless radio transceivers with a finite range of transmission. In networks where the communication through a wired infrastructure, or in networks where the communication is performed using a mixture of wired and wireless infrastructures, the definition of a "hop" may be appropriate to the nature of the communication medium. In some exemplary implementations in spatial computing, a "hop" may be defined as a function of the spatial distance between nodes, and a node x is a 1-hop neighbor of node y if node y is within a specific distance of node x. A node z that is within radio range of node y but not within range of node x, is a 2-hop neighbor of node x, and a 1-hop neighbor of node y. A k-hop neighborhood of a node is the set of all nodes that can be reached in at most k hops. Moreover, a "hop" may be defined using any application-imposed topology, such as be k-means clustering or a Delaunay triangulation.

There are multiple ways to represent this application using the abstract task graph 200 representation, and the following representation is merely exemplary.

In this example, four types of tasks may be defined. The four types of tasks are the "Sampler" task 210, the "RootCollector" task 220, the "Neighbor Monitor" task 230 and the "AlarmActuator" task 240.

The "Sampler" task 210 may be a task that runs on each node of the system, that is executed periodically, for example, with a period of 30 minutes, and whenever it is executed, accesses a temperature sensor interface to read the current temperature. The "NeighborMonitor" task 230 may be a task that runs on each node of the system, that is also executed periodically, for example, with a period of 10 minutes, and that samples the temperature and sends its reading to its neighboring nodes. Also, the "Neighbor Monitor" task 230 may read the latest messages and/or reading sent by its neighbors and compare them with its own reading. If the difference is more than 5 degree C., for example, the "NeighborMonitor" task 230 may produce an alarm notification. The "Rootcollector" task 220 may only run on one node in the entire network, the "root node," which is assumed to be indicated in the network description. This task may be executed whenever a reading from a "Sampler" 210 is received and may display the reading on a screen. Finally, the "AlarmActuator" task 240 may run only on one node in the entire network, the "root node," whenever an alarm notification sent by a "NeighborMonitor" 230 is received, and may activate an alarm.

Moreover, several exemplary abstract data items may be defined. For example, the "SampledTemperature" data item 215 may represent the periodically sampled temperature by the "Sampler" task 210 that is sent to the "RootCollector" task 220. Also, the "LocalGradient" data item 225 may represent the temperature reading communicated between "NeighborMonitor" tasks 230. The "AlarmEvent" data item 235 may represent the alarm notification sent by the "NeighborMonitor" task 230 to the "AlarmActuator" task 240.

In this example, the following input and output dependencies between the different tasks may be identified. For example, the "Sampler" task 210 has no inputs, and has one output, the "SampledTemperature" data item 215. Hence, there may be one output channel 245 associating the "Sampler"task 210 with the "SampledTemperature" data item 215. The "NeighborMonitor" task 230 has one input, the "LocalGradient" data item 225, and two outputs, the "LocalGradient" data item 225 and the "AlarmEvent" data item 235. Hence, there may be one input channel 250 and one output channel 255 associating the "NeighborMonitor" task 230 with the "LocalGradient" data item 225, and one output channel 260 associating the "NeighborMonitor" task 230 with the "AlarmEvent" data item 235.

The "RootCollector" task 220 has one input, the "SampledTemperature" data item 215 and no output. Hence, there may only be one input channel 265 associating the "RootCollector" task 220 with the "SampledTemperature" data item 215. The "AlarmActuator" task 240 has one input, the "AlarmEvent" data item 235 and no output. Hence, there may be only one input channel 270 associating the "AlarmActuator" task 240 with the "AlarmEvent" data item 235.

It should be noted that the fact that a task has an output dependency with a data item does not necessarily mean that every invocation of the task must result in the production of every such data item. For example, if the "LocalGradient" data item 225 readings are within an acceptable range, no "AlarmEvent" data item 235 will be produced according to the specific commands of the "NeighborMonitor" task 230.

Each task, data item, and channel entity in an abstract task graph may be annotated. For example, the annotations 280 of a given task may include its periodic or a periodic nature, the associated period if the task is periodic, its instantiation density such as, for example, one instance of the task on each node, one instance in every 10 nodes, one instance in every square mile, one instance only on sensor nodes designated "root", one instance on every sensor node with a specific type of resource available, or the like. The annotations 280 that are relevant in this example are shown in FIG. 2. Since no annotations of data items are required in this illustrative example, none are shown. However, there could be annotations for the data items as well as for the tasks or for the channels.

The channel annotations 290 of the input or output channels may indicate which instances of the particular data item are of interest to the given task. For example, labeling an output channel as "local" may mean that the data item produced by that task should be added only to the local data pool of that node, and should not be proactively communicated, upon production, to any other node in the network. Similarly, labeling an output channel as "1-hop" may mean that the data item should be sent to 1-hop neighbors. Labeling an input channel as "all nodes" may mean that the instances of that type of data item produced on any node in the network should be sent to the node that is hosting the consuming task.

The concept of a data pool at a sensor node may refer to: (i) the set of instances of types of data items that are present on a node at a given point in time and possibly waiting to be consumed by one or more tasks scheduled for execution on that node, or waiting to be transmitted to other nodes of the network as appropriate; and may also refer to (ii) the set of storage locations where these instances of types of data items reside. Production and consumption of data objects by tasks may be modeled in terms of addition to and removal form the data pool. Moreover, a data pool manager is typically associated with the data pool. The responsibilities of a data pool manager may include controlling access by multiple tasks to the data pool, scheduling tasks for execution when the appropriate type of data item is added to the data pool, and the like.

Special semantics may be associated with situations where a task both produces and uses a data item to present an infinite loop of execution of the same task on a given node. The relationship between the "NeighborMonitor" task 230 and the "LocalGradient" data item 225 is an example of this scenario. In this case, the "1-hop" annotation on the output channel may mean that the data item of type "LocalGradient" produced by the "NeighborMonitor" task 230 will be sent only to 1-hop neighbors and not added to the local data pool at all. The only instances of this data item type that may appear in the local data pool are those sent by the "NeighborMonitor" tasks 230 on the 1-hop neighbor nodes.

In the above description, no mention is made of a particular network deployment, of the number of nodes in the network or of the topology of the network. The same abstract task graph may be used to configure various networks, where configuration involves, for example, deciding which tasks should run on which node(s) in the network, and how data items may be sent from node to node such that the behavior specified in the ATaG is realized.

It should be noted that common patterns of information flow in networks, in this case, the spatial dissemination and collection pattern, may be expressed using simple annotations on the interest channels such as "1-hop," "local" "all nodes," and the like. Accordingly, more sophisticated annotations may be defined as needed or desired. In this particular example, merely indicating that the input to the "RootCollector" task 220 is made up of "SampledTemperature" 215 type of items produced on "all nodes" 290 is enough for the runtime system to set up suitable data paths in the network and generate all the necessary networking level coordination code.

Figure 3:
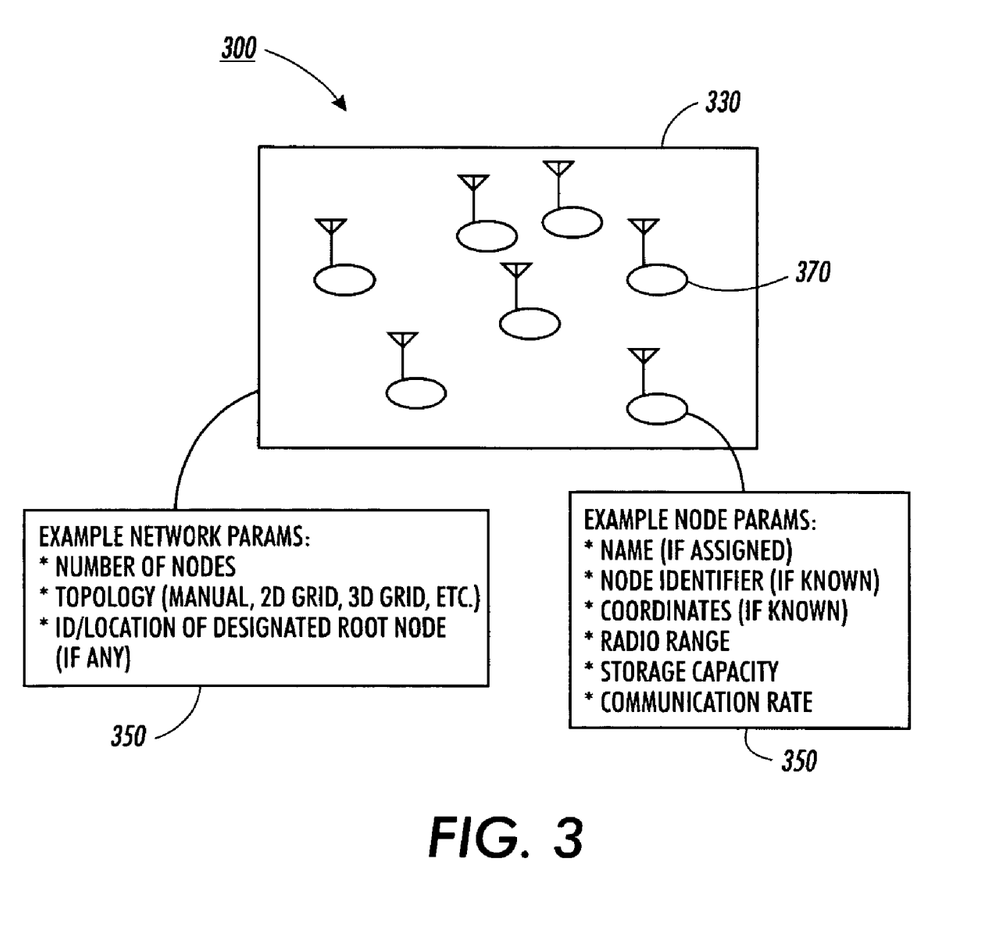
FIG. 3 is an illustration of an exemplary annotated network graph.

FIG. 3 is an exemplary illustration of an annotated network graph 300. In FIG. 3, the annotated network graph 300 may be used to specify parameters of a target network 330 for a compilation process to suitably translate an abstract task graph specification of an application into a set of configuration files that dictate the behavior of the runtime system to be deployed on each node 370 of the network 330 so that the desired functionality, as specified in the abstract task graph and the user-specified code for application-level tasks is achieved.

The annotated net graph 300 may be specified, for example through a graphical user interface, in a variety of ways. For example, the annotated network graph 300 may be specified by: (i) individually adding a graphical object 350 depicting a node 370 to a graphical object 350 depicting the network 330, and inputting the required parameters of each node 370, (ii) selecting a network description from a library of network descriptions already available in the graphical environment, or (iii) selecting a network description from a library of parameterized network descriptions already available in the graphical environment and customizing it by modifying parameter values as desired. The annotated network graph 300 may be specified by a textual description also, although the graphical interface may be more desirable from the perspective of ease of use and ease of visualization.

Figure 4:
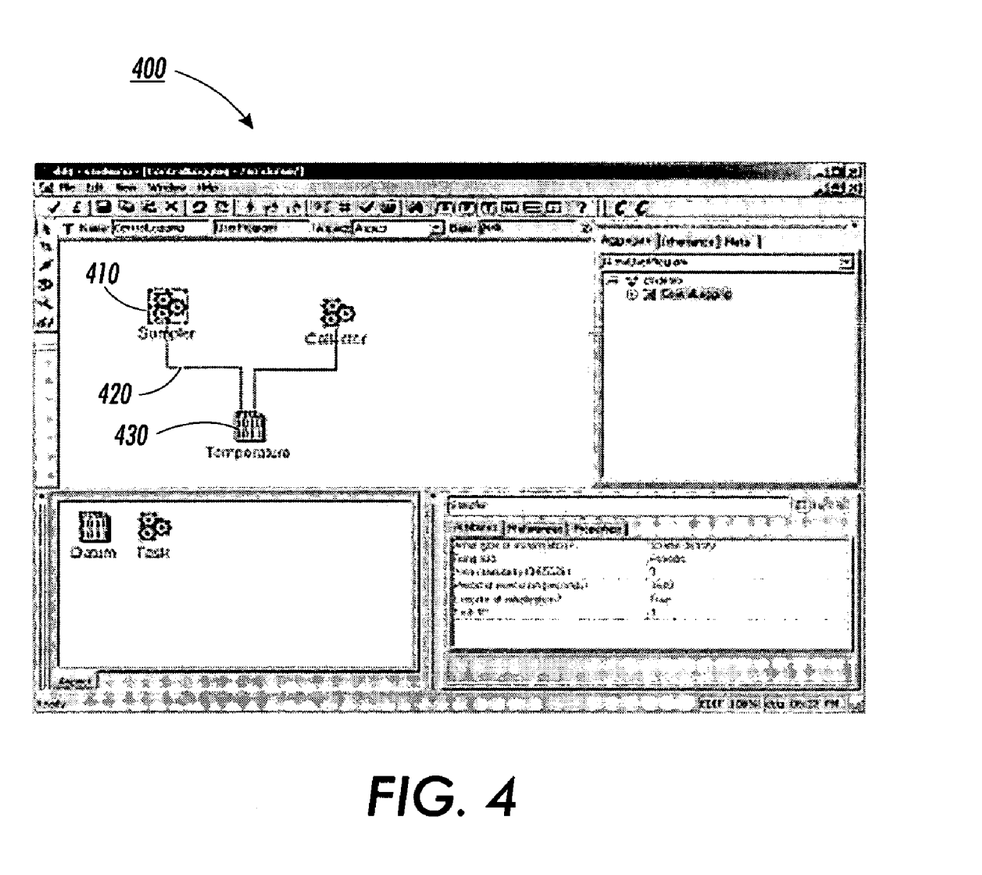
FIG. 4 is an illustration of an exemplary graphical user interface for designing a network.

FIG. 4 is an illustration of an exemplary graphical user interface (GUI) 400 that may be used to design a network. In FIG. 4, the graphical user interface 400 is used to define a task item 410, a data object 430 and a channel 420. The task item 410 by itself may represent a type of processing that may occur in the network, but does not specify how many instances of that type of processing are present in the network at a given time. Each task may have a set of annotations, a logical name associated by the programmer with that type of processing, a task code that is a user supplied code to be invoked when the data items are available. The annotations associated with the task object govern, for example, where and when it will be instantiated in the network. An example annotation could relate to the type of instantiation. This annotation may have several alternate values, and the programmer may be required to choose one or more of these as suitable. For example, one of the types of instantiation could be "Nodes per task". If the user chooses this type of instantiation, he/she may be required to give a parameter value which may indicate the density of instantiation. For example, a value of 10 may indicate that one in 10 sensor nodes may host one instance of this task. Another type of instantiation may be "Spatial extent". The parameter provided by the user for this type may be a list of coordinates that define a specific region of deployment. The task may then be mapped onto every node that lies within that specified region. Other types of instantiations may be defined. The types of instantiation may also be combined in other ways. For example, a combination of "Spatial extent" and "Nodes per task" may be used to instantiate the task with a specific density only in a specific region of the network and nowhere else. If the region is specified to be small enough, the task may even be instantiated on a specific node in the network.

Other types of instantiation conditions may be specified, such as, for example, resource availability, and the like. Since the term "resource" may also refer to a sensing interface, this type of instantiation may allow a programmer to specify that a task, which presumably reads from a specific type of sensing interface, should only be instantiated on nodes which are equipped with that type of interface.

Another annotation of the abstract task object may be a firing rule, which specifies when the task is to be scheduled for execution based on the availability of input data objects 430. A task may be periodic such as, for example, execute at a specified frequency throughout the lifetime of the node, and may be defined as any-data, or all-data, which defines a disjunction and conjunction over the input items respectively. More annotations such as the ones discussed here may be defined and appropriately translated in the context of a specific network architecture.

Each data object 430 may also have one or more of the following annotations, which may include for example: i) payload, which is the application specific data structure; ii) spatial origin; and iii) temporal origin, where every data object produced is time-stamped with the local time at the node of production. Spatial origin may be a point of origin such as a geographic location a node ID, or both. In addition, the data object may contain a globally unique identifier and serial number, that distinguishes it from all other data objects, which is useful in case the resolution of the temporal annotation is insufficient to make this distinction. The runtime system may add the spatio-temporal origin, and the application may query for its availability and use the information if available. While this information may not help if the network is not globally synchronized and/or localized, it may be useful, when available, if the application, for instance, temporally orders packets arising from the same location which may or may not reach a given destination node in the order of dispatch. Adding these tags to an instance of a data object and assigning the responsibility of doing so to the runtime system allows a programmer to avoid being concerned with details of clock synchronization, localization, and the like.

Another benefit may be that this feature may be selectively turned on or off by the programmer, in the event that where the application-specific task code does not use timestamps or location coordinates. Turning this feature off may lead to the exclusion of the responsible modules at code synthesis time, which may otherwise increase the resulting computational and/or communication overhead. Another annotation that may be associated with a data object is a lifetime, which may be spatial or temporal in nature. The corresponding parameter value provided by the programmer may specify how long in time and/or how far in distance is a data object valid, relative to its spatio-temporal location of origin. The runtime system could be responsible for garbage collection once the lifetime has expired and if any instances of the data object still remain in the system. This annotation could be used, for example, for limited data dissemination. For example, a task could specify its output data object as "disseminate to all nodes" but associate a spatial expiration with the data object. In such case, the data object will be sent out from the node of production but will only disseminate to a certain spatial extent from the origin.

Each channel 420 may have one or more of the following annotation, which may include for example: i) dependency (input or output), which specifies whether the data object 430 linked by this channel to a particular task 410 is an input to the task or an output of the task; and ii) push/pull behavior, where each channel, regardless of its input or output annotation, is also specified as a pull channel or a push channel. However, push/pull semantics may specify if the data movement is proactive or reactive with respect to the task 410. For example, if a channel 420 is annotated as an "input" and "push" channel, it means that the underlying system may require the producer of the object 430 on the remote node to "push" the object, as soon as an instance is produced, to the place of consumption. Semantics may be specified for all combinations of input/output and push/pull, where 'pull' means that when the consumer of a data object requires the data object, it goes out and retrieves it from the producer, as opposed to 'push' where the producer actively decides to send the data to the consumer.

Another annotation for a channel 480 may be the spatial nature of the task's Interest, which can be, for example, a k-hop neighborhood about each node, with k specified by a user, an r-radius neighborhood about each node, with the value of "r" specified by a user. An annotation can be region based, with a region boundary specified by the user, or attribute based with an operator on the data object specified by the user. For example, if an input channel 420 is labeled as k-hop, every data object produced within a k-hop neighborhood is channeled to the task for input. The above 4 types could be combined, for example, combining k-hop neighborhood and attribute-based filtering to specify only channel data item produced within k hops and also meeting a certain criterion.

Another annotation for a channel 420 may be longevity of data over the channel, where the channel 420 may have an associated expiration in terms of number of hops, distance traveled, time since production, or the like. If a channel 420 has a temporal expiration with a specified longevity, it may mean that the data over that channel 420 is of interest to a task only if its age is less than a certain number of time units. A similar role may also be played by the "lifetime" annotation of the data object. Either of these annotations may be used, based on the programmer's preference and the nature of the application. The choice of annotation is generally a design decision.

Another annotation for a channel 420 may be the nature of the endpoint, where each channel may be labeled as 'storage' or 'consumption'. If the endpoint is 'consumption', then if a node pushes data to some other node and there is no task mapped to that node which consumes the data, then the compiler may instruct the runtime never to transmit data to that node. Conversely, if the nature of end point is 'storage', then the runtime on all destination nodes may be responsible for caching a copy of that data. If some other task then specifies an interest channel that envelops the endpoint, that data may be transferred to the requestor, even if the channel does not envelop the sender. This is a way to provide 'persistent' storage of data objects in a limited sense. The runtime may have its own protocol and process for storing the data and asking for it. This may allow the system to provide support for systems where interest channels may be dynamic, that is, new interest channels may come into being, and/or interest channels may dynamically change some of their attributes (e.g. going from a 1 hop to a 2 hop neighborhood during the sensing process.

Figure 5:
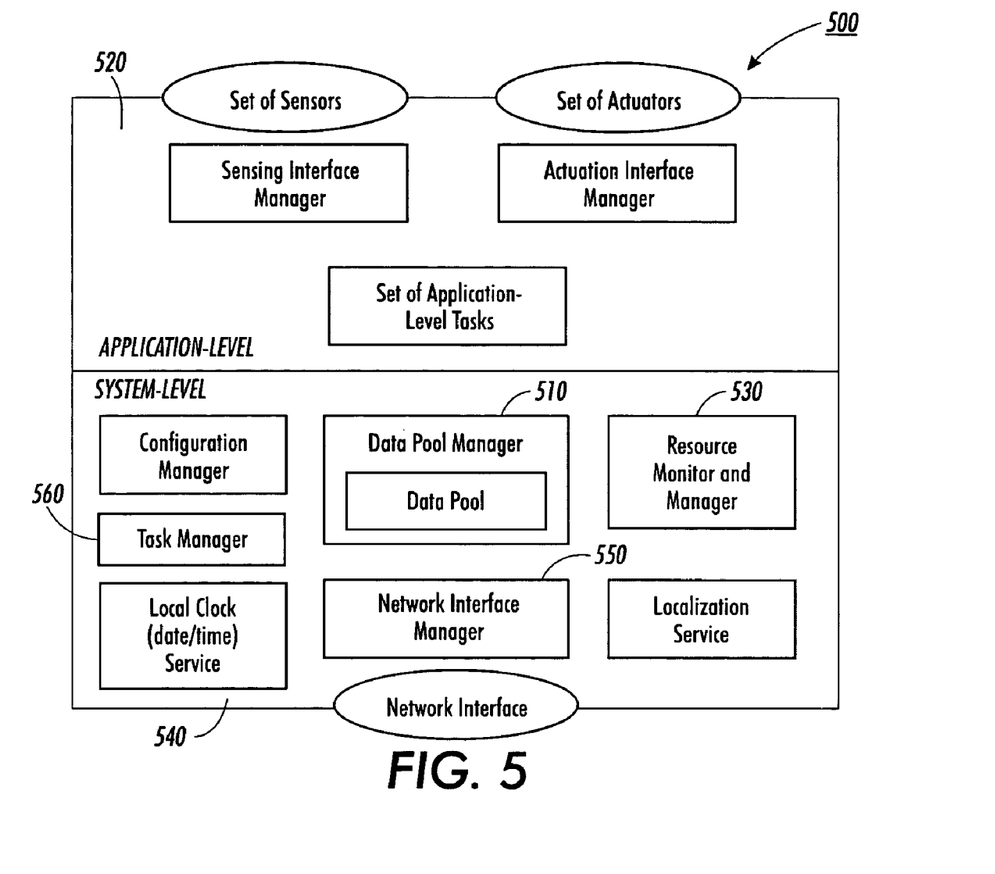
FIG. 5 is an illustration of an exemplary run time system.

FIG. 5 is an illustration of a runtime system according to various implementations. In FIG. 5, the main components of an envisioned runtime system 500 are depicted. More components may be present depending on the application and/or the platform (language, operating system, node hardware). For example, a time synchronization service can interact with the network interface and the local clock to ensure that the local clock is synchronized with neighbors. Arrows that could denote interactions between components are deliberately omitted because the exact interactions between components may depend on many factors. In an ideal design, the application-level tasks 520 may be able to interact directly with a sensing interface, an actuation interface, and a data pool manger 510. Other components, a including a resource manager 530, a network interface manager 550, a task Manager 560, and the like, may be hidden. However, another implementation of this design may allow application-level tasks 520 with direct access to a network interface or to a resource monitor and Manager 530, for example. Therefore, specific patterns of interaction are not shown in order to avoid conveying misleading or restrictive assumptions about the workings of the system 500.

A controller may be used to dynamically control the distribution of tasks and communication channels based on the abstract task graph, to control performance of the set of task and to use the data objects and channels to configure the network.

Figure 6:
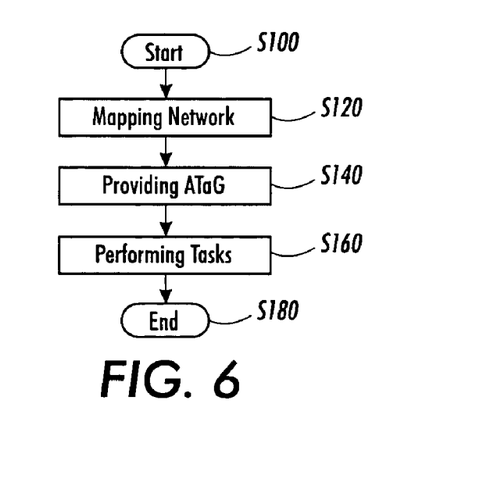
FIG. 6 is a flowchart illustrating an exemplary method of network configuration.

FIG. 6 is a flowchart illustrating an exemplary network synthesis method according to various implementations. The method starts in step S100, and continues to step S120, during which a network is mapped. During step S120, the network on which a set of tasks are to be performed is first recognized, then mapped. According to various implementations, mapping the network consists in determining the nature, location, and the like, of the nodes that constitute the network. Next, control continues to step S140.

During step S140, an abstract task graph is provided, wherein the abstract task graph includes a set of tasks, a set of data objects and a set of channels. Next control continues to step S160, where the tasks are performed on relevant nodes of the network on the basis of the nature of the data objects and of the channels. Next, control continues to step S180, where the method ends.

While various details have been described in conjunction with exemplary implementations, these details should be viewed as illustrative, not limiting. Various modifications, substitutes, or the like are possible in view of the foregoing disclosure. For example, additional annotations can be defined for tasks and channels that allow the end user to indicate performance requirements and constraints, and also the costs of task execution which can be determined a priori. Alternate implementations can be associated with the same abstract task objects, each characterized by a different cost of performance and assumptions about the execution environment. Annotations can be associated with channels to guide the selection of suitable network-level protocols at run time. For example, consider a task T that is linked to a data object D through an input channel C. Using a suitably defined annotation for the channel, the programmer could indicate that all instances of the data object D should be routed immediately to the suitable instance of the consuming task T.

What is claimed is:

1. A task assignment method for a spatial computing network, the method comprising:
    providing an abstract task graph, the abstract task graph comprising a set of tasks, a set of data objects and a set of channels;
    assigning the tasks to nodes of the network;
    causing the nodes to communicate with each other via the tasks, the data objects and the channels; and determining automatically when the abstract task graph is compiled onto a specific network, wherein each task has a set of annotations whose instantiation values comprise nodes per task, spatial extent, resource availability, and a firing rule.

2. The method of claim 1, wherein assigning the tasks is performed via at least one of:
synthesizing instructions at the time at which the network is configured; and
changing functionality dynamically as a number, placement and connectivity of the nodes change over time.

3. The method of claim 1, wherein providing the abstract task graph is performed via a graphical user interface, the graphical user interface allowing a user to specify the set of tasks in the form of the abstract task graph without explicitly specifying a distribution of the tasks.

4. The method of claim 1, wherein the nodes are caused to communicate on the basis of constraints specified by annotations made by a user.

5. The method of claim 1, wherein assigning the tasks to nodes of the network comprises:
parsing the abstract task graph via a software; and
specifying tasks to each node of the network, the tasks being instances of tasks from the set of tasks.

6. The method of claim 1, wherein a task from the set of tasks comprises:
a task code;
instantiation parameters that determine spatial constraints on a number of times the task is to be performed on specified desired characteristics of the nodes on which the task is to be performed; and
a firing rule that specifies when the task is to be scheduled to be performed.

7. The method of claim 6, wherein the spatial constraints are one of at least spatial density and topological density 8. The method of claim 1, wherein a data object from the set of data objects comprises:
a payload that is an application specific data structure;
a spatial origin that is the point of origin of the data object; and
a temporal origin that is the time of production of the data object.

9. The method of claim 1, wherein a channel from the set of channels comprises at least one of:

a dependency that specifies a data object that is linked by the channel to a task;
a push/pull behavior that specifies a direction of the data movement over the channel;
a spatial nature of interest;
longevity of data; and
nature of endpoint that specifies whether data should be stored even when no instance of a consumer task is mapped onto the nodes, or deleted when no instance of a consumer task is mapped onto the nodes.

10. The method of claim 2, wherein the network is one of at least static, wherein the nodes do not change in nature, and dynamic, wherein the nodes change in nature.

11. The method of claim 1, wherein the abstract task graph is provided independently of a number, placement and connectivity of the nodes.

12. A task assignment system for a spatial computing network, comprising:
a controller that controls a performance of a set of tasks and using data objects from a set of data objects, and channels from a set of channels, in configuring a network according to an abstract task graph that comprises the set of tasks, the set of objects and the set of channels, wherein
the tasks, data objects and channels are architecture-independent, and
an automatic determination is made when the abstract task graph is compiled onto a specific network, wherein each task has a set of annotations whose instantiation values comprise nodes per task, spatial extent, resource availability, and a firing rule.

13. The system of claim 12, wherein the controller controls:
parsing the abstract task graph via a software; and
specifying a task to each node of the network, the task being instances of tasks from the set of tasks assigned to the node.

14. A machine-readable medium that provides instructions for configuring a network, the instructions, when executed by a processor, cause the processor to perform the operations of claim 1.

* * * * *